Mar. 27, 1923.
J. B. KOHLER
FAUCET APPLIANCE
Filed Mar. 27, 1922
1,449,822
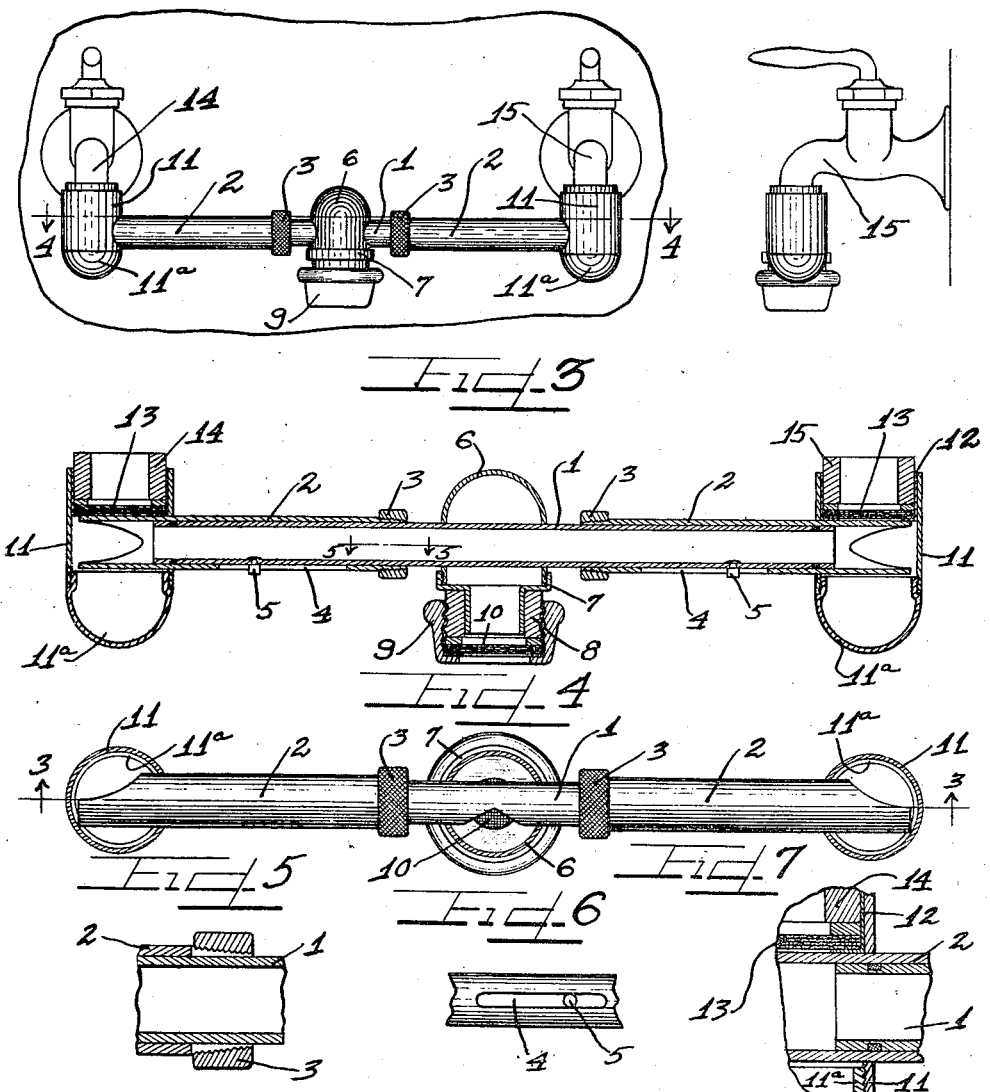

Patented Mar. 27, 1923.

1,449,822

UNITED STATES PATENT OFFICE.

JOHN B. KOHLER, OF CHICAGO, ILLINOIS.

FAUCET APPLIANCE.

Application filed March 27, 1922. Serial No. 547,178.

*To all whom it may concern:*

Be it known that I, JOHN B. KOHLER, a citizen of the United States, and a resident of the city of Chicago, in the county of Cook and State of Illinois, have invented certain new and useful Improvements in a Faucet Appliance; and I do hereby declare that the following is a full, clear, and exact description of the same, reference being had to the accompanying drawings, and to the numerals of reference marked thereon, which form a part of this specification.

This invention relates to a faucet appliance that is adapted to connect both the hot and cold water pipes or faucets thereof.

It is an object of this invention to provide a cheap and simple structure that can be readily adjusted for different distances between the hot and cold water pipes, or any pipes that it is desired to connect to a single faucet.

With these and other objects in view which will become more apparent in the following description and disclosure, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views:

Figure 1 is a front elevational view of the faucet appliance.

Figure 2 is an end elevation thereof.

Figure 3 is a section through the faucet appliance on substantially line 3—3 of Figure 4 upon an enlarged scale.

Figure 4 is a section substantially on the line 4—4 of Figure 1 upon an enlarged scale.

Figure 5 is a section on the line 5—5 of Figure 3 upon an enlarged scale.

Figure 6 is a fragmentary plan view of a feature of construction upon an enlarged scale.

Figure 7 is a fragmentary sectional view upon an enlarged scale illustrating the connection of the faucet appliance to a faucet therefor.

In referring now to the drawings, which illustrate an embodiment of this invention, the reference numeral 1 represents the delivery pipe of the faucet appliance which is provided with extensible ends comprising pipe members 2 which slidingly telescope thereover, the inner ends of which may be slightly split if desired as shown in Figure 5, in order to more readily yield under the clamping action of the nuts 3 which are screw-threaded upon the inner beveled ends of the pipes 2 and are adapted to b:nd the pipe members 2 in adjusted position. Each extensible pipe member 2 is preferably provided with a slot 4 in which the head of a pin 5 slidingly fits to prevent relative rotation between the pipe 1 and extension members 2.

The nozzle of the faucet appliance is preferably secured centrally of the delivery pipe 1 and comprises a dome-shaped member 6 closed at its upper end and provided with alined apertures through which the pipe 1 passes. A nozzle member 7 is screw-threaded upon the lower end of the dome-shaped member and provided with a reduced portion upon which a sleeve member 8 is welded or brazed. A cap member 9 is screw-threaded upon the sleeve member for the purpose of confining a filter 10 across the discharge end of the nozzle member in order to strain and filter the water passing through the nozzle. The pipe 1 is provided with an aperture in the dome-shaped member as shown in Figure 4 whereby the water escapes from the delivery pipe 1 to the nozzle.

The ends of the extension members 2 are adapted to be secured to hot and cold water faucets. And for this purpose there are provided a pair of thimble-shaped connecting members 11, one for each end of the faucet appliance. Suitable apertures are provided in the sides of these thimble members for receiving the ends of the extension members 2. A sleeve member 12 having a horizontal annular flange is secured in the upper end of each thimble member for supporting a screen or filter 13 that is adapted for extending across the nozzle of the faucet 15. These thimble members are preferably made in two parts, the lower or closed part 11ª being screw-threaded upon the upper part whereby the lower part 11ª may be removed for cleaning the same from sediment or the like that may collect therein.

In the present instance, the thimble members are illustrated as connected to the hot and cold water faucets 14 and 15 by having the same telescope over the nozzles thereof and the extension pipes 2 are provided with beveled or cut away ends so that the hot and cold water may more readily enter the same.

This faucet appliance is frequently desirable for connecting separate hot and cold water faucets in order to more readily regulate the desired temperature of water desired, and as the same is made extensible, it can readily be applied to various hot and cold water systems.

I am aware that numerous details of construction may be varied through a wide range without departing from the principles of this invention, and I therefore do not purpose limiting the patent granted otherwise than necessitated by the prior art.

I claim as my invention:

1. In a faucet appliance, a delivery pipe provided with a nozzle, a pair of pipes adjustably telescoping over the ends of the delivery pipe, and a pair of sectional thimble members connected respectively to the ends of said adjustable pipes, the lower closed ends of said thimble members being removable and the upper ends being adaptable for connection to faucets.

2. In a faucet appliance, a delivery pipe, a nozzle having a dome-shaped head through which said pipe passes, a pair of rectilinear extension pipes adjustably telescoping over the ends of said delivery pipe, and sectional thimble members attached to the ends of said extension pipes, the lower closed ends of said thimble members being removable and the upper ends being adapted for attachment to faucets.

In testimony whereof I have hereunto subscribed my name in the presence of two subscribing witnesses.

JOHN B. KOHLER.

Witnesses:
CARLTON HILL,
JAMES M. O'BRIEN.